(12) United States Patent
Shiota et al.

(10) Patent No.: US 10,940,706 B2
(45) Date of Patent: Mar. 9, 2021

(54) MEDIUM TRANSPORT APPARATUS, IMAGE READING APPARATUS, AND TRANSPORT CONTROL METHOD

(71) Applicant: SEIKO EPSON CORPORATION, Tokyo (JP)

(72) Inventors: Takayuki Shiota, Kitakyushu (JP); Seiji Eguchi, Kitakyushu (JP); Hidetoshi Masuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/696,902

(22) Filed: Nov. 26, 2019

(65) Prior Publication Data

US 2020/0171856 A1 Jun. 4, 2020

(30) Foreign Application Priority Data

Nov. 30, 2018 (JP) .............................. JP2018-225012

(51) Int. Cl.
*B41J 13/00* (2006.01)
*H04N 1/00* (2006.01)

(52) U.S. Cl.
CPC ...... *B41J 13/0009* (2013.01); *H04N 1/00676* (2013.01); *H04N 1/00702* (2013.01); *H04N 1/00777* (2013.01); *H04N 1/00809* (2013.01)

(58) Field of Classification Search
CPC .... B41J 13/0009; B41J 11/0095; B41J 11/42; B41J 11/425; B41J 13/0018; B41J 23/025; B41J 29/393; B41J 2/04566; B41J 2/32; B41J 2/355; B41J 33/22; B41J 33/34; B41J 33/54; B41J 35/36; B41J 11/006; H04N 1/00676; H04N 1/00702; H04N 1/00809; H04N 1/00713; H04N 1/00721; H04N 1/00774; H04N 1/00777; H04N 1/00779; H04N 1/00798; H04N 1/00832; H04N 1/121; H04N 1/123; H04N 1/2032; H04N 1/387; H04N 1/407; H04N 1/4097; B65H 7/14; B65H 2801/03
USPC ......................................................... 358/386
See application file for complete search history.

(56) References Cited

U.S. PATENT DOCUMENTS

| | | | |
|---|---|---|---|
| 8,827,268 B2 | 9/2014 | Morikawa et al. | |
| 10,389,900 B2 * | 8/2019 | Arimori ............ | H04N 1/00774 |
| 2006/0159471 A1 | 7/2006 | Yasukawa et al. | |
| 2007/0237558 A1 | 10/2007 | Nakanishi | |

(Continued)

FOREIGN PATENT DOCUMENTS

| | | |
|---|---|---|
| CN | 103625953 | 3/2014 |
| JP | 2003-205654 | 7/2003 |

(Continued)

*Primary Examiner* — Negussie Worku
(74) *Attorney, Agent, or Firm* — Workman Nydegger

(57) ABSTRACT

A medium transport apparatus includes a feeding section configured to nip a medium and feed the medium in a transport direction, a sensor disposed to face a side of the medium being transported in the transport direction, the sensor being configured to detect motion of the medium, and a control unit configured to stop the transport of the medium based on a detection value received from the sensor, in which during a period including a time at which a leading edge of the medium is nipped by the feeding section, the control unit continues transporting the medium irrespective of the detection value from the sensor.

10 Claims, 11 Drawing Sheets

(56) References Cited

U.S. PATENT DOCUMENTS

| | | | |
|---|---|---|---|
| 2010/0141999 A1* | 6/2010 | Akahane | H04N 1/0057 |
| | | | 358/1.16 |
| 2014/0054841 A1 | 2/2014 | Morikawa et al. | |
| 2015/0288839 A1* | 10/2015 | Sohara | H04N 1/00819 |
| | | | 358/474 |
| 2017/0111524 A1* | 4/2017 | Tajima | H04N 1/00037 |
| 2017/0225494 A1* | 8/2017 | Tokunaga | B41J 2/2135 |
| 2017/0344819 A1* | 11/2017 | Murahashi | G06K 9/00442 |
| 2018/0154661 A1* | 6/2018 | Tokai | B41J 11/0095 |
| 2019/0100396 A1* | 4/2019 | Shiota | H04N 1/00734 |
| 2019/0256307 A1* | 8/2019 | Kogi | B65H 3/5284 |
| 2020/0106906 A1* | 4/2020 | Mabara | H04N 1/00702 |
| 2020/0172357 A1* | 6/2020 | Arimori | B65H 3/0607 |
| 2020/0177751 A1* | 6/2020 | Shiota | B65H 7/02 |

FOREIGN PATENT DOCUMENTS

| | | |
|---|---|---|
| JP | 2006-193286 | 7/2006 |
| JP | 2007-276982 | 10/2007 |
| JP | 2019-029794 | 2/2019 |

* cited by examiner

MEDIUM TRANSPORT APPARATUS, IMAGE READING APPARATUS, AND TRANSPORT CONTROL METHOD

The present application is based on, and claims priority from JP Application Serial Number 2018-225012, filed Nov. 30, 2018, the disclosure of which is hereby incorporated by reference herein in its entirety.

BACKGROUND

1. Technical Field

The present disclosure relates to a medium transport apparatus for transporting a medium and an image reading apparatus having the medium transport apparatus. The present disclosure also relates to a transport control method in the medium transport apparatus.

2. Related Art

Some known image reading apparatuses and recording apparatuses employ a method of detecting a skewed medium and performing predetermined control. For example, JP-A-2003-205654 discloses an ink jet printer configured to detect skewed paper by using a motion sensor, and based on the amount of skew, change a carriage reciprocation range so as not to discharge ink to places other than the paper.

The motion sensor includes a two-dimensional semiconductor image sensor having vertically and horizontally arranged pixels. For example, the image sensor has 20×20 pixels, and the two-dimensional semiconductor image sensor receives light reflected from the paper and obtains an image. The motion sensor analyzes the obtained image, calculates an amount of transport of paper transported in a transport direction (hereinafter, referred to as "vertical movement amount") and an amount of transport of paper transported in a direction orthogonal to the transport direction (hereinafter, referred to as "lateral movement amount"), and outputs the amounts as detection values.

When an error occurs during the paper transport, the vertical movement amount and the lateral movement amount change from the normal transport condition. By detecting the change, it can be determined that the paper transport is under an abnormal condition, and the paper transport can be stopped. In the paper transport, however, temporary transport variations may occur although they are not transport errors such as a jam, and such transport variations may be erroneously detected as a transport error such as a jam.

SUMMARY

A medium transport apparatus according to an aspect of the present disclosure for solving the above-described problem includes a feeding section configured to nip a medium and feed the medium in a transport direction, a sensor disposed to face a side of the medium being transported in the transport direction, the sensor being configured to detect motion of the medium, and a control unit configured to stop the transport of the medium based on a detection value received from the sensor. During a period including a time at which a leading edge of the medium is nipped by the feeding section, the control unit continues transporting the medium irrespective of the detection value from the sensor.

DESCRIPTION OF EXEMPLARY EMBODIMENTS

Figure 1:
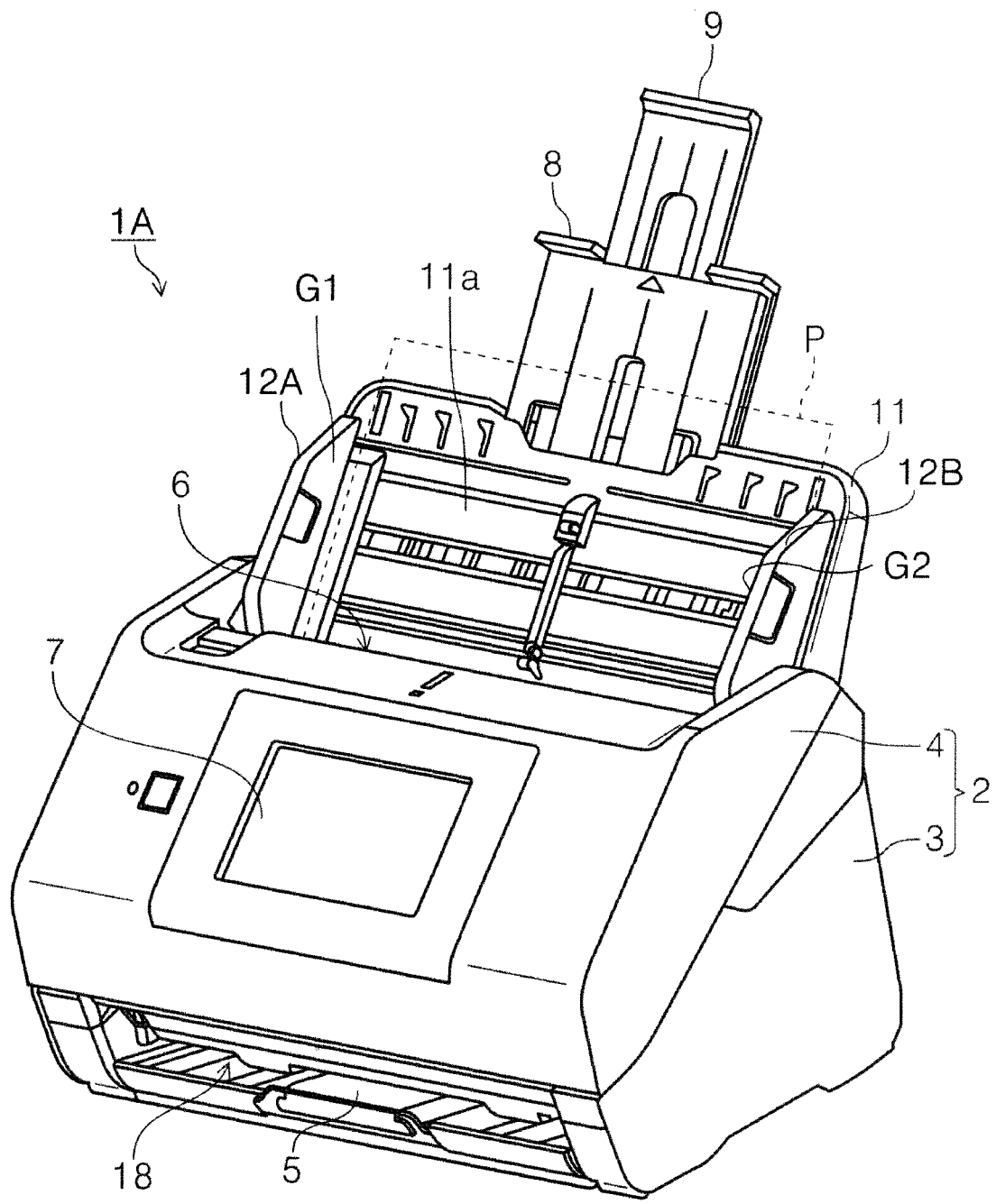
FIG. 1 is an external perspective view of a scanner.

Hereinafter, a brief overview of the present disclosure will be described. A medium transport apparatus according to an aspect of the present includes a feeding section configured to nip a medium and feed the medium in a transport direction, a sensor disposed to face a side of the medium being transported in the transport direction, the sensor being configured to detect motion of the medium, and a control unit configured to stop the transport of the medium based on a detection value received from the sensor. During a period including a time at which a leading edge of the medium is nipped by the feeding section, the control unit continues transporting the medium irrespective of the detection value from the sensor.

When a leading edge of the medium is nipped by the feeding section, temporary transport variations tend to occur, and thus temporary variations in the detection value from the sensor tend to occur. To solve the problem, in this aspect, during a period including a time at which a leading edge of the medium is nipped by the feeding section, the control unit continues transporting the medium irrespective of the detection value from the sensor. With this operation, an erroneous determination based on the temporary transport variations can be prevented or reduced. During the above-described period, an error may actually occur in transporting the medium. In such a case, in most cases, detection values from the sensor indicate abnormal values after the period has passed, and thus the medium transport error can be detected.

According to a second aspect of the present disclosure, a medium transport apparatus includes a feeding section configured to nip a medium and feed the medium in a transport direction, a sensor disposed to face a side of the medium being transported in the transport direction, the sensor being configured to detect motion of the medium, and a control unit configured to stop the transport of the medium based on a detection value received from the sensor. During a period including a time at which a trailing edge of the medium is released from the state nipped by the feeding section, the control unit continues transporting the medium irrespective of the detection value from the sensor.

When a trailing edge of the medium is released from the state nipped by the feeding section, temporary transport variations tend to occur, and thus temporary variations in the detection value from the sensor tend to occur. To solve the problem, in this aspect, during a period including a time at which a trailing edge of the medium is released from the state nipped by the feeding section, the control unit continues transporting the medium irrespective of the detection value from the sensor. With this operation, an erroneous determination based on the temporary transport variations can be prevented or reduced. During the above-described period, an error may actually occur in transporting the medium. In such a case, in most cases, detection values from the sensor indicate abnormal values after the period has passed, and thus the medium transport error can be detected.

According to a third aspect of the present disclosure, in the second aspect, the medium transport apparatus may further include a medium mounting section on which a medium is to be mounted. In this structure, the feeding section comprises a feeding roller configured to feed the medium from the medium mounting section, and a separation roller configured to nip the medium with the feeding roller therebetween to separate the medium.

When a trailing edge of the medium is released from the state nipped by the feeding roller and the separation roller, temporary transport variations are more likely to occur, and thus temporary variations in the detection value from the sensor tend to occur. According to this aspect, during a period including a time at which a trailing edge of the medium is released from the state nipped by the feeding roller and the separation roller, the control unit continues transporting the medium irrespective of the detection value from the sensor. Accordingly, an erroneous determination due to the temporary transport variations can be prevented or reduced.

According to a fourth aspect of the present disclosure, a medium transport apparatus includes a feeding section configured to nip a medium and feed the medium in a transport direction, a sensor disposed to face a side of the medium being transported in the transport direction, the sensor being configured to detect motion of the medium, and a control unit configured to stop the transport of the medium based on a detection value received from the sensor. During a period including a time at which a speed of feeding the medium is changed, the control unit continues transporting the medium irrespective of the detection value from the sensor.

When a speed of feeding the medium is changed, temporary transport variations tend to occur, and thus temporary variations in the detection value from the sensor tend to occur. According to this aspect, during a period including a time at which a speed of feeding the medium is changed, the control unit continues transporting the medium irrespective of the detection value from the sensor. Accordingly, an erroneous determination due to the temporary transport variations can be prevented or reduced. During a period including a time at which a speed of feeding the medium is changed, an error may actually occur in transporting the medium. In such a case, in most cases, detection values from the sensor indicate abnormal values after the period has passed, and thus the medium transport error can be detected.

According to a fifth aspect of the present disclosure, in the fourth aspect, during a period including a time at which the document feeding speed is changed from zero or a constant speed state to an accelerated state, the control unit may continue transporting the medium irrespective of the detection value from the sensor.

When the document feeding speed is changed from zero or a constant speed state to an accelerated state, temporary transport variations are more likely to occur. According to this aspect, during a period including a time at which the document feeding speed is changed from zero or a constant speed state to an accelerated state, the control unit continues transporting the medium irrespective of the detection value from the sensor. Accordingly, an erroneous determination due to the temporary transport variations can be more efficiently prevented or reduced.

According to a sixth aspect of the present disclosure, a medium transport apparatus includes a medium mounting section on which a medium is to be mounted, a feeding roller configured to feed the medium from the medium mounting section, a sensor disposed to face a side of the medium being transported in the transport direction, the sensor being configured to detect motion of the medium, and a control unit configured to stop the transport of the medium based on a detection value received from the sensor. During a period including a time at which a trailing edge of the medium being transported passes through a detection position of the sensor before the start of the feeding of a next medium, the control unit continues transporting the medium irrespective of the detection value from the sensor.

After a trailing edge of the medium being transported passes through a detection position of the sensor, before the start of the feeding of a next medium, the sensor faces the next medium to be fed. The next medium to be fed is in contact with the medium being fed and the position may be changed, and this may be erroneously determined that the medium being transported is under an abnormal condition. According to this aspect, after a trailing edge of the medium being transported passes through a detection position of the sensor before the start of the feeding of a next medium, the control unit continues transporting the medium irrespective of the detection value from the sensor, and thus the above-described erroneous determination can be prevented or reduced.

According to a seventh aspect of the present disclosure, a medium transport apparatus includes a feeding section configured to nip a medium and feed the medium in a transport direction, a sensor disposed to face a side of the medium being transported in the transport direction, the sensor being configured to detect motion of the medium, and a control unit configured to stop the transport of the medium based on a detection value received from the sensor. In determining to stop the transport of the medium, the control unit uses a first threshold value and a second threshold value that is used in determining to stop the transport of the medium at a lower level than a level the first threshold value is used, and during a period including at least one of a time at which a leading edge of the medium is nipped by the feeding section and a time at which a trailing edge of the medium is released from the state nipped by the feeding section, the control unit uses the second threshold value and during the other periods, uses the first threshold value.

According to this aspect, in determining to stop the transport of the medium, the control unit uses a first threshold value and a second threshold value that is used in determining to stop the transport of the medium at a lower level than a level the first threshold value is used, and during a period including at least one of a time at which a leading edge of the medium is nipped by the feeding section and a time at which a trailing edge of the medium is released from the state nipped by the feeding section, the control unit uses the second threshold value and during the other periods, uses the first threshold value. Accordingly, an erroneous determination due to the temporary transport variations can be prevented or reduced.

According to an eighth aspect of the present disclosure, in any one of the first to seventh aspects, the sensor may be a two-dimensional sensor configured to detect motion of the medium in a two-dimensional coordinate system having a first axis and a second axis. According to this aspect, in the structure in which the sensor is a two-dimensional sensor configured to detect motion of the medium in a two-dimensional coordinate system having a first axis and a second axis, the effect according to one of the above-described first to eighth aspect can be obtained.

According to a ninth aspect of the present disclosure, an image reading apparatus includes a reading section configured to read a medium, and the medium transport apparatus according to any one of the above-described first to eighth aspects configured to transport the medium to the reading section. According to this aspect, in the image reading apparatus, the effect according to one of the above-described first to eighth aspects can be obtained.

According to a tenth aspect of the present disclosure, a transport control method in a medium transport apparatus including a feeding section configured to feed a medium in a transport direction, and a sensor disposed to face a side of the medium being transported in the transport direction, the sensor being configured to detect motion of the medium is provided. The method includes, during a period including one of a time at which a leading edge of the medium is nipped by the feeding section and a time at which a trailing edge of the medium is released from the state nipped by the feeding section, transporting the medium irrespective of a detection value from the sensor.

When a leading edge of the medium is nipped by the feeding section and when a trailing edge of the medium is released from the state nipped by the feeding section, temporary transport variations tend to occur, and thus temporary variations in the detection value from the sensor tend to occur. To solve the problem, in this aspect, during a period including one of a time at which a leading edge of the medium is nipped by the feeding section and a time at which a trailing edge of the medium is released from the state nipped by the feeding section, the transport of the medium is continued irrespective of a detection value from the sensor. Accordingly, an erroneous determination due to the temporary transport variations can be prevented or reduced. During the above-described periods, an error may actually occur in transporting the medium. In such a case, in most cases, detection values from the sensor indicate abnormal values after the period has passed, and thus the medium transport error can be detected.

Hereinafter, an embodiment of the present disclosure will be specifically described. In the following description, an image reading apparatus according to an embodiment will be described with reference to the drawings. In this embodiment, as an example image reading apparatus, a document scanner (hereinafter, simply referred to as a scanner 1A) that can read an image on at least one of the front side and the back side of a document P will be described.

In an X-Y-Z coordinate system in the drawings, an X direction denotes an apparatus width direction and a document width direction that intersects a document transport direction. A Y direction denotes the document transport direction. A Z direction intersects the Y direction and is approximately orthogonal to a side of a document P being transported. A +Y direction denotes a direction from an apparatus rear toward an apparatus front, and a −Y direction denotes a direction from the apparatus front toward the apparatus rear. A left direction viewed from the apparatus front denotes a +X direction, and a right direction denotes a −X direction. A +Z direction denotes an apparatus upper direction, and a −Z direction denotes an apparatus lower direction. A direction (+Y direction) toward which a document P is transported denotes "downstream" and the opposite direction (−Y direction side) denotes "upstream".

FIG. 1 is an external perspective view of the scanner 1A according to the embodiment of the present disclosure. The scanner 1A has an apparatus body 2 that includes therein a reading section 20 (FIG. 2) for reading an image on a document P. The apparatus body 2 includes a lower unit 3 and an upper unit 4. The upper unit 4 is openably and closably attached to the lower unit 3 so as to be rotated about its downstream side in the document transport direction as a rotation axis with respect to the lower unit 3. The upper unit 4 can be rotated and opened toward the apparatus front direction so as to expose a transport path of a document P for a user to readily fix a jam of the document P.

A document mounting section 11 that has a mounting surface 11a, on which a document P to be fed can be mounted, is provided at a position near the apparatus rear of the apparatus body 2. The document mounting section 11 can be detachably attached to the apparatus body 2. The document mounting section 11 is provided with a pair of edge guides for guiding side edges in the width direction (X direction) that intersects the document transport direction (Y direction), specifically, a first edge guide 12A and a second edge guide 12B are provided. The first edge guide 12A and the second edge guide 12B have guide surfaces G1 and G2 for guiding the side edges of a document P, respectively.

The document mounting section 11 is provided with a first paper support 8 and a second paper support 9. The first paper support 8 and the second paper support 9 can be retracted into the document mounting section 11 and can be pulled out from the document mounting section 11 as illustrated in FIG. 1 such that the length of the mounting surface 11a can be adjusted.

The apparatus body 2 has an operation panel 7 on the apparatus front of the upper unit 4. On the operation panel 7, a user interface (UI) for setting various settings for reading, executing a reading operation, displaying reading setting contents, or the like is implemented. The operation panel 7 according to the embodiment is a touch panel through which both of a displaying operation and an inputting operation can be performed. The operation panel 7 serves as an operation section for performing various operations and a display section for displaying various kinds of information. A feed port 6 that is connected to the inside of the apparatus body 2 is provided in an upper portion of the upper unit 4. A document P mounted on the document mounting section 11 is fed from the feed port 6 toward the reading section 20 provided in the apparatus body 2. A discharge tray 5 for receiving a discharged document P is provided on the apparatus front side of the lower unit 3.

Figure 2:
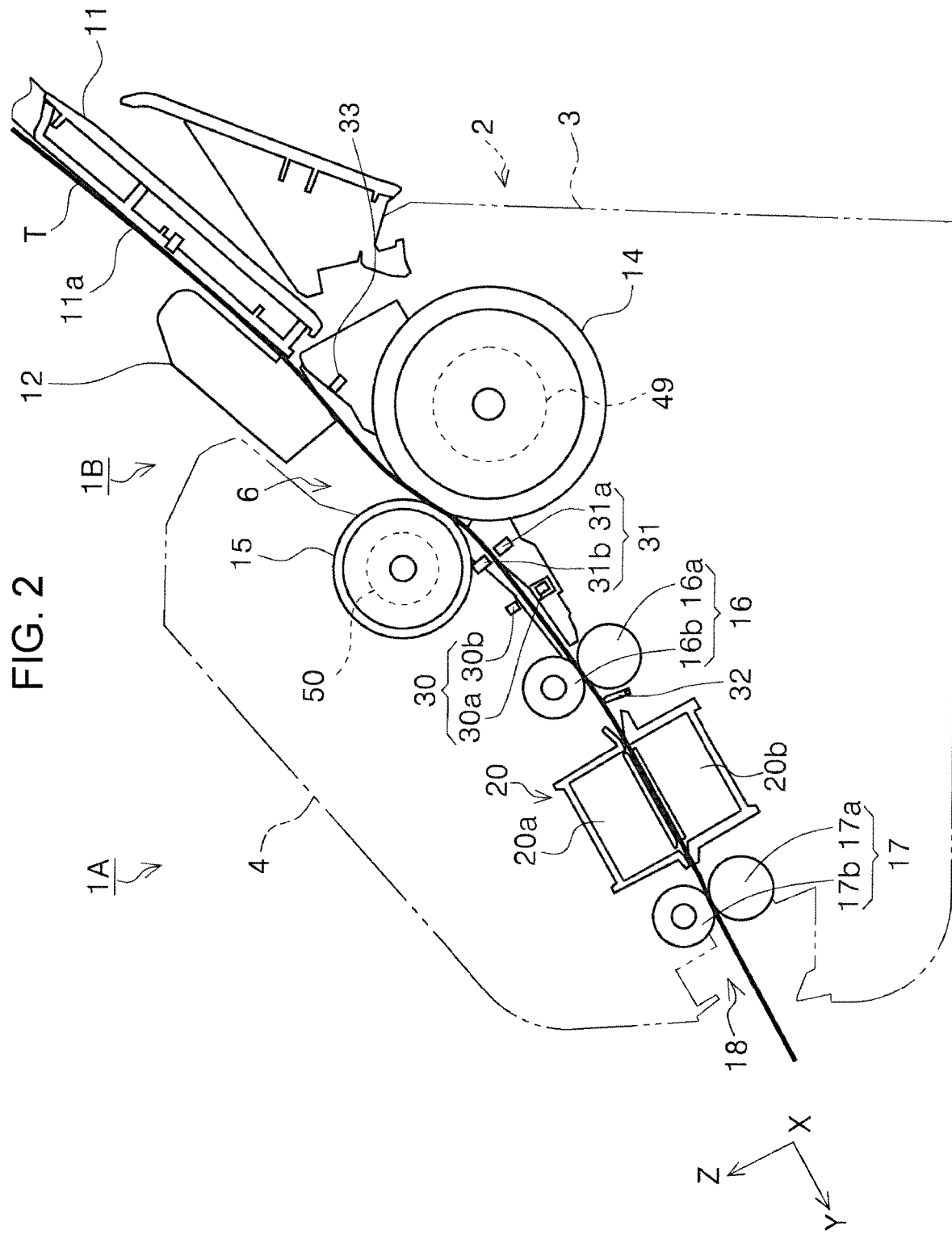
FIG. 2 is a side cross-sectional view of a document transport path in a scanner.
Figure 3:
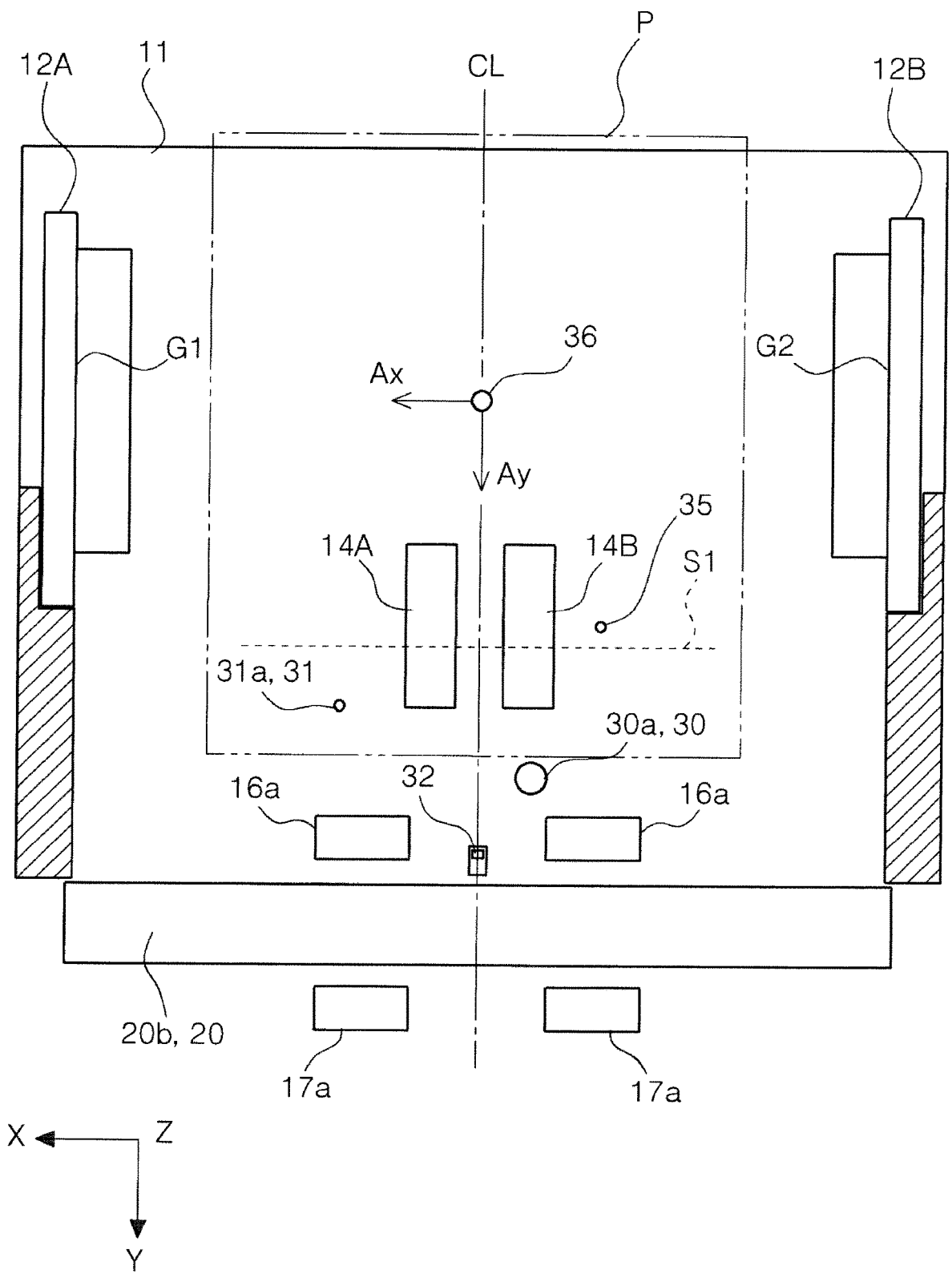
FIG. 3 is a plan view of a document transport path in a scanner.

A document feeding path in the scanner 1A will be described mainly referring to FIG. 2 and FIG. 3. FIG. 2 is a side cross-sectional view of a document feeding path in the scanner 1A according to the embodiment. FIG. 3 is a plan view of the document feeding path. The scanner 1A includes a medium transport apparatus 1B (FIG. 2). The medium transport apparatus 1B can serve as an apparatus that has the functions of the scanner 1A except the document reading function, specifically, the reading section 20, which will be described below. Alternatively, from a point of view in the document transport, the scanner 1A itself may be a medium transport apparatus even though the scanner 1A has the reading section 20. In FIG. 2, the solid line indicated by a symbol T indicates a document feeding path, that is, a trajectory of a document P. The document feeding path T is a space defined by the lower unit 3 and the upper unit 4.

The document mounting section 11 is disposed on the most upstream side of the document feeding path T. A feeding roller 14 for feeding a document P mounted on the mounting surface 11a of the document mounting section 11 toward the reading section 20 and a separation roller 15 for nipping the document P with the feeding roller 14 and separating the document P are disposed on the downstream side of the document mounting section 11. The pair of the feeding roller 14 and the separation roller 15 is an example feeding section for feeding a document P downstream.

The feeding roller 14 comes into contact with a lowermost document P of documents P mounted on the mounting surface 11a of the document mounting section 11. Accordingly, when a plurality of documents P are set on the document mounting section 11 in the scanner 1A, the documents P are fed sequentially from the document P on the side of the mounting surface 11a toward the downstream side.

In this embodiment, two feeding rollers 14 are disposed to be symmetric with respect to the central position CL in the document width direction as illustrated in FIG. 3. In FIG. 3, a reference numeral 14A denotes the feeding roller 14 on the left side with respect to the central position CL, and a reference numeral 14B denotes the feeding roller 14 on the right side with respect to the central position CL, respectively. Similarly, two separation rollers 15 are disposed to be symmetric with respect to the central position CL although not illustrated in FIG. 3. A broken line S1 in FIG. 3 indicates a leading edge of a document P, which is mounted on the document mounting section 11, before the start of the feeding. The position of the leading edge of the document P mounted on the document mounting section 11 is regulated to the position S1 by a position controller (not illustrated). The position controller is moved to a retracted position when the feeding operation starts.

Figure 4:
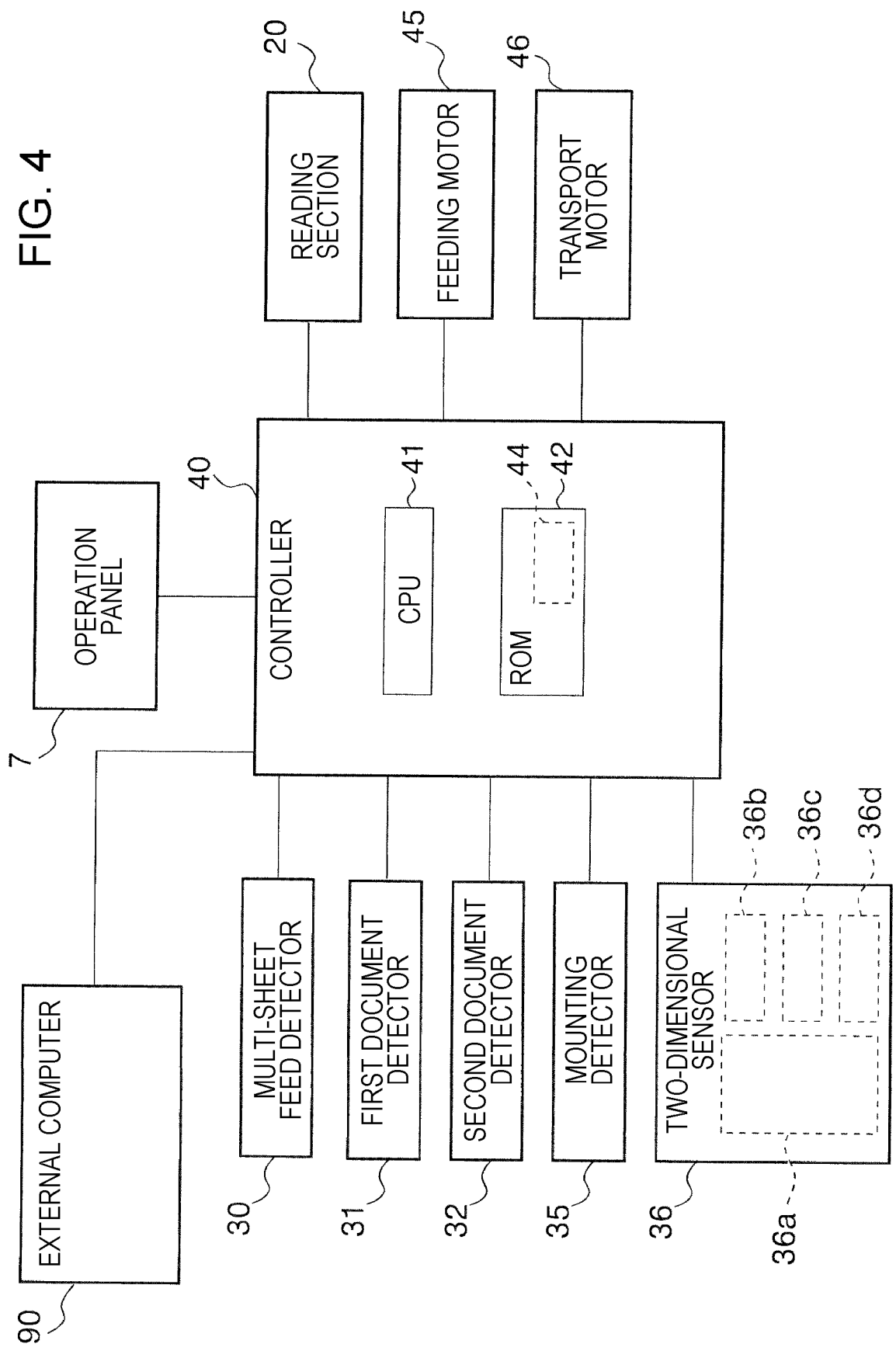
FIG. 4 is a block diagram of a control system in a scanner.

The feeding roller 14 is driven and rotated by a feeding motor 45 (FIG. 4). With the rotation torque from the feeding motor 45, the feeding roller 14 rotates in the counterclockwise direction in FIG. 2. To the feeding roller 14, the driving force from the feeding motor 45 is transmitted through a one way clutch 49. With the rotation torque from the feeding motor 45, the feeding roller 14 rotates in the counterclockwise direction in FIG. 2, that is, rotates in the forward rotation direction to feed the document P downstream.

Since the one way clutch 49 is disposed in the driving force transmission path between the feeding roller 14 and the feeding motor 45 (FIG. 4), even if the feeding motor 45 rotates in the reverse direction, the feeding roller 14 does not rotate in the reverse direction. While the feeding motor 45 is stopped, the feeding roller 14 can come into contact with a document P being transported and rotate in the forward rotation direction. For example, when a leading edge of a document P is detected by a second document detector 32 disposed on the downstream side of a transport roller pair 16, a controller 40 stops driving of the feeding motor 45, and drives only a transport roller 46. By the operation, the document P is transported by the transport roller pair 16, and the feeding roller 14 comes into contact with the document P being transported and is rotated in the forward rotation direction.

To the separation roller 15, rotation torque is transmitted from the transport motor 46 (FIG. 4) via a torque limiter 50. During the feeding operation of the document P, from the transport motor 46 (FIG. 4) to the separation roller 15, drive torque for rotating the separation roller 15 in the reverse rotation direction (counterclockwise direction in FIG. 2) is transmitted.

When no document P is provided or only one sheet of document P is provided between the feeding roller 14 and the separation roller 15, rotation torque causing the separation roller 15 to rotate in the forward rotation direction (clockwise direction in FIG. 2) exceeds limit torque of the torque limiter 50, resulting in the slippage in the torque limiter 50. With this operation, the separation roller 15 is rotated in the forward rotation direction irrespective of the rotation torque from the transport motor 46 (FIG. 4).

While the document P is being fed, if a second document P and subsequent documents P enter between the feeding roller 14 and the separation roller 15, a slippage will occur between the documents, and then the separation roller 15 rotates in the reverse direction with the rotation torque from the transport motor 46 (FIG. 4). This reverse rotation returns the second document P and subsequent documents P to be fed together to the upstream side, that is, the multi-sheet feeding of the documents P can be prevented.

Note that outer circumferential surfaces of the feeding roller 14 and the separation roller 15 are made of an elastic material such as elastomer. If a coefficient of friction between the feeding roller 14 and the separation roller 15 is $\mu 1$, a coefficient of friction between documents is $\mu 2$, a coefficient of friction between the feeding roller 14 and a document P is $\mu 3$, and a coefficient of friction between the separation roller 15 and a document P is $\mu 4$, a relationship $\mu 1 > \mu 2$ holds. Also, a relationship $\mu 1 > \mu 3$, $\mu 4$ holds. Also, a relationship $\mu 2 < \mu 3$, $\mu 4$ holds. Also, a relationship $\mu 4 > \mu 3$ holds.

On the downstream side of the feeding roller 14, the transport roller pair 16, which serves as a feeding section, the reading section 20 for reading images, and a discharging roller pair 17 are disposed. The transport roller pair 16 includes a transport driving roller 16a that is driven to rotate by the transport motor 46 (FIG. 4), which serves as a transport motor, and transport driven roller 16b that is rotated. In this embodiment, two transport driving rollers 16a are disposed to be symmetric with respect to the central position CL as illustrated in FIG. 3. Similarly, two transport driven rollers 16b are disposed to be symmetric with respect to the central position CL although not illustrated in FIG. 3. A document P nipped by the feeding roller 14 and the separation roller 15 and fed downstream is nipped by the transport roller pair 16 and transported to the reading section 20 that is disposed on the downstream side of the transport roller pair 16. In other words, the transport roller pair 16 is an example feeding section for feeding a document P downstream.

The reading section 20 includes an upper read sensor 20a that is provided on the side of the upper unit 4 and a lower read sensor 20b that is provided on the side of the lower unit 3. In this embodiment, as an example, the upper read sensor 20a and the lower read sensor 20b are configured as a contact image sensor (CIS) module (CISM).

After an image on at least one of the front side and the back side of a document P has been read in the reading section 20, the document P is nipped by the discharging roller pair 17 that is disposed on the downstream side of the reading section 20 and discharged from a discharge port 18 that is provided on the apparatus front side of the lower unit 3. The discharging roller pair 17 includes a discharge driving roller 17a that is driven to rotate by the transport motor 46 (FIG. 4) and a discharge driven roller 17b that is rotated. Two discharge driving rollers 17a are disposed to be symmetric with respect to the central position CL as illustrated in FIG. 3 in this embodiment. Similarly, two discharge driven rollers 17b are disposed to be symmetric with respect to the central position CL although not illustrated in FIG. 3. In other words, the discharging roller pair 17 is an example feeding section for feeding a document P downstream.

Hereinafter, a control system in the scanner 1A will be described with reference to FIG. 4. FIG. 4 is a block diagram of a control system in the scanner 1A according to the embodiment of the present disclosure. In FIG. 4, the controller 40, which serves as a control unit, controls feeding, transporting, discharge control, and reading control of a document P, and performs various kinds of control of the scanner 1A. To the controller 40, signals are input from the operation panel 7, and from the controller 40, signals for displaying the operation panel 7, in particular, signals for implementing a user interface (UI) are sent to the operation panel 7.

The controller 40 controls the feeding motor 45 and the transport motor 46. As described above, the feeding motor 45 is a drive source for the feeding roller 14 illustrated in FIG. 2, and the transport motor 46 is a drive source for the separation roller 15, the transport roller pair 16, and the discharging roller pair 17 illustrated in FIG. 2. Each of the feeding motor 45 and the transport motor 46 according to the embodiment is a direct current (DC) motor. To the controller 40, read data is input from the reading section 20, and from the controller 40, signals for controlling the reading section 20 are sent to the reading section 20. To the controller 40, signals from a mounting detector 35, a two-dimensional sensor 36, a multi-sheet feed detector 30, a first document detector 31, and the second document detector 32, which will be described below, are also input. To the controller 40, detection values from an encoder for detecting an amount of rotation of the feeding motor 45 and an encoder for detecting an amount of rotation of the transport driving roller 16a and the discharge driving roller 17a are also input, and based on the detection values, the controller 40 detects amounts of document transport by the rollers.

The controller 40 includes a central processing unit (CPU) 41 and a flash read-only memory (ROM) 42. The CPU 41 performs various arithmetic processing in accordance with a program 44 stored in the flash ROM 42 and performs overall operational control of the scanner 1A. The flash ROM, which is an example storage, is a readable and writable nonvolatile memory and stores data necessary for abnormality determination, which will be described below. When not specifically described in this specification, parameters necessary for the abnormality determination, parameters necessary for the control, and the like are all stored in the flash ROM 42, and the values are updated by the controller 40 as necessary. Various kinds of setting information input by a user via the operation panel 7 is also stored in the flash ROM 42. The program 44 stored in the flash ROM 42 may be a single program or may be a plurality of programs including a program for determining an error in the document feeding path T, a program for changing a threshold value described below, a program for controlling a UI displayed on the operation panel 7, various control programs necessary for transporting and reading documents P, and the like.

The scanner 1A is configured to be connected to an external computer 90, and to the controller 40, information is input from the external computer 90. The external computer 90 includes a display section (not illustrated). A user interface (UI) is implemented on the display section by a control program stored in a storage (not illustrated) in the external computer 90.

Now, detectors that are disposed in the document transport path T will be described. The two-dimensional sensor 36 is provided in the document mounting section 11. The two-dimensional sensor 36 faces a lowermost document P of documents P mounted on the document mounting section 11. The two-dimensional sensor 36 is a sensor similar to a sensor that can detect motion of a detection target in a two-dimensional (planar) coordinate system used for computer mice, or a sensor based on a similar principle, and includes a controller 36a, a light source 36b, a lens 36c, and an image sensor 36d. The light source 36b is a light source for illuminating a document P mounted on the document mounting section 11 with light via the lens 36c. The light source 36b may be, for example, a red light-emitting diode (LED), an infrared LED, a laser, or a blue LED, and in this embodiment, laser light is employed. The lens 36c guides the light emitted from the light source 36b toward a document P mounted on the document mounting section 11 to illuminate the document P with the light.

The image sensor 36d is a sensor that receives light reflected from a document P mounted on the document mounting section 11, and is, for example, an image sensor such as a complementary metal-oxide semiconductor (CMOS) sensor or a charge coupled device (CCD) sensor. The image sensor 36d has pixels arranged along a first axis direction Ax and a second axis direction Ay orthogonal to the first axis direction Ax. It is to be understood that, in this specification, the "first axis direction Ax" denotes not one of a +Ax direction and a −Ax direction, but both of the +Ax direction and the −Ax direction. Similarly, the "second axis direction Ay" denotes not one of a +Ay direction and a −Ay direction, but both of the +Ay direction and the −Ay direction. The controller 36a analyzes an image captured by the image sensor 36d and outputs a moving distance Wx of the image in the first axis direction Ax and a moving distance Wy of the image in the second axis direction Ay as detection values (output values). For the image analysis method by the controller 36a, a known method used for computer mice can be used.

As will be described in detail below, the controller 40, which obtains detection values in the first axis direction Ax and the second axis direction Ay from the two-dimensional sensor 36, uses the obtained detection values to determine the transport condition of a document P that is a lowermost document P of documents P mounted on the document mounting section 11 and being fed. The two-dimensional sensor 36 according to the embodiment outputs moving distances Wx and Wy in the first axis direction Ax and the second axis direction Ay to the controller 40 respectively, and the output values are reset to zero by an initialization instruction from the controller 40.

It is to be understood that although the example two-dimensional sensor 36 is the optical sensor, the two-dimensional sensor 36 may be a mechanical sensor, more specifically, a sensor having a trackball, a rotary encoder for detecting the rotation of the trackball in the first axis direction Ax and a rotary encoder for detecting the rotation of the trackball in the second axis direction Ay.

On the downstream side of the two-dimensional sensor 36, the mounting detector 35 for detecting whether a document P is mounted on the document mounting section 11 is disposed. The mounting detector 35 includes a light source and a sensor for receiving reflected light components of the light emitted from the light source. The controller 40 detects the presence or absence of a document P on the document mounting section 11 based on a difference in reflected light intensity between a case in which the document P is on the document mounting section 11 and a case in which no document P is on the document mounting section 11.

On the downstream side of the feeding roller 14, the first document detector 31 is disposed. The first document detector 31 is, for example, an optical sensor that includes a light emitting unit 31a and a light receiving unit 31b that face each other across the document feeding path T as illustrated in FIG. 2. The light receiving unit 31b sends an electrical signal that indicates the intensity of detection light to the controller 40 (FIG. 4). A document P being transported interrupts the detection light emitted from the light emitting unit 31a and the electrical signal indicating the intensity of the detection light changes, and by the signal change, the controller 40 can detect the passage of a leading edge or a trailing edge of the document P.

On the downstream side of the first document detector 31, the multi-sheet feed detector 30 that detects multi-sheet feeding of documents P is disposed. The multi-sheet feed detector 30 includes an ultrasonic transmitter 30a and an ultrasonic receiver 30b for receiving ultrasonic waves that face each other across the document feeding path T as illustrated in FIG. 2. The ultrasonic receiver 30b sends an output value corresponding to the intensity of detected ultrasonic waves to the controller 40. When multi-sheet feeding of documents P occurs, the electrical signal indicating the intensity of the ultrasonic waves changes and thereby the controller 40 can detect the multi-sheet feeding of the documents P.

On the downstream side of the multi-sheet feed detector 30, the second document detector 32 is disposed. The second document detector 32 is a contact sensor that has a lever. In response to the passage of a leading edge or a trailing edge of a document P, the lever rotates and the electrical signal sent from the second document detector 32 to the control section 40 changes. By the signal change, the controller 40 can detect the passage of the leading edge or the trailing edge of the document P. The controller 40 can determine the location of a document P in the document feeding path T with the above-described first document detector 31 and the second document detector 32.

Figure 11:
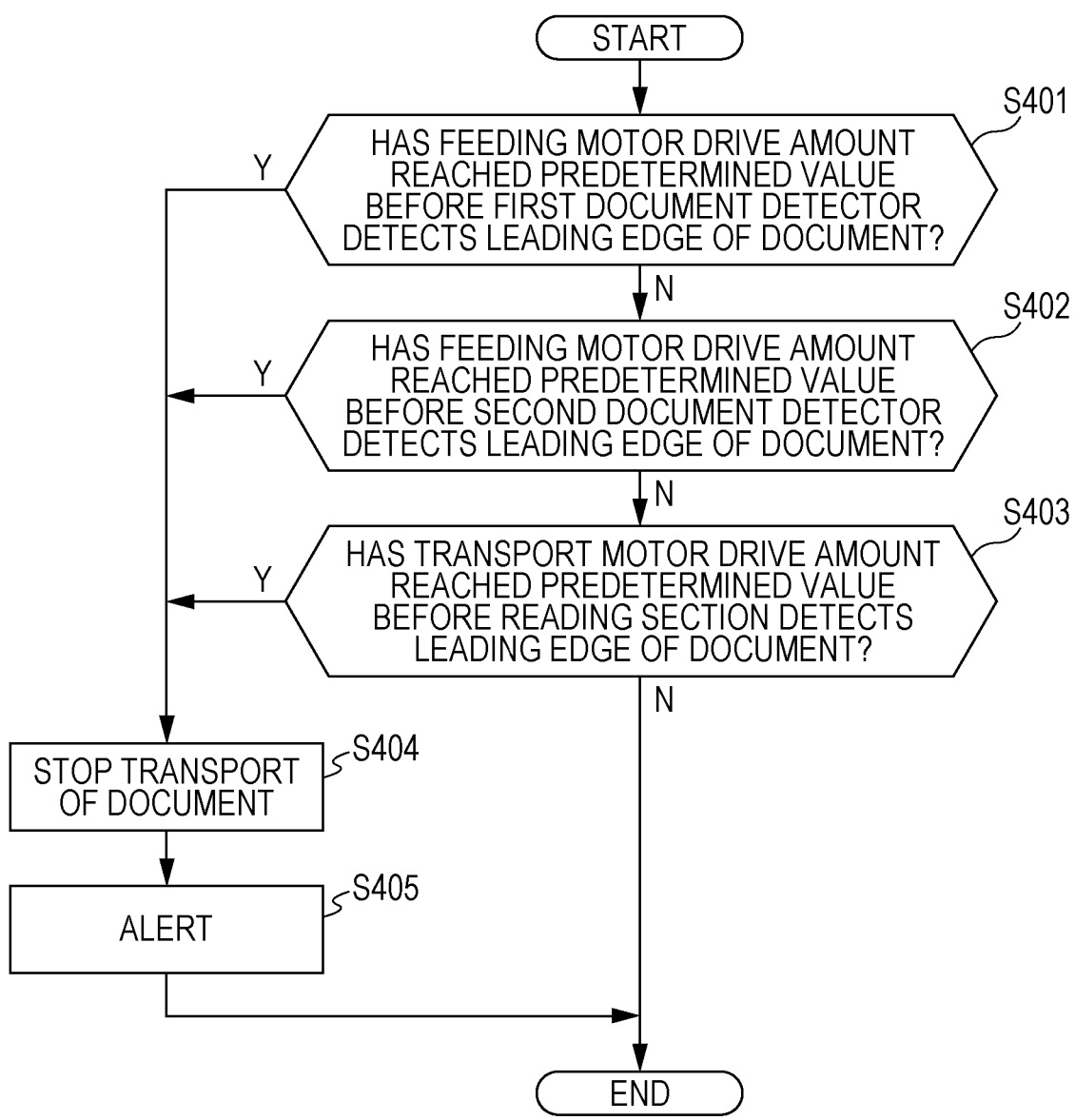
FIG. 11 is a flowchart illustrating a flow of jam determining processing in document scanning.

Now, jam determination to be performed by using the first document detector 31 and the second document detector 32 will be described with reference to FIG. 11. In this embodiment, in response to the execution of a scanning operation, the controller 40 performs the jam determination illustrated in FIG. 11, and simultaneously performs abnormality determination relating to the transport of a document P by using the two-dimensional sensor 36 described below. First, transport stop control based on jam determination is described. In response to the start of a document scanning operation, the controller 40 determines whether an amount of drive of the feeding motor 45 reaches a predetermined value before the first document detector 31 detects a leading edge of a document (step S401). When the amount of drive of the feeding motor 45 reaches the predetermined value before the first document detector 31 detects the leading edge of the document (Yes in step S401), the controller 40 determines that a jam has occurred and stops the transport of the document P (step S404), and sounds an alert indicating an occurrence of a transport error (step S405). Note that the predetermined value of the amount of drive of the feeding motor 45 in step S401 is an amount of drive of the feeding motor 45 in feeding a document P from a position S1 in FIG. 3 to the first document detector 31 with a certain amount of margin added to the amount of drive.

When No in step S402, that is, when the first document detector 31 has detected the leading edge of the document before the amount of drive of the feeding motor 45 reaches the predetermined amount, the controller 40 determines whether an amount of drive of the feeding motor 45 reaches the predetermined value before the second document detector 32 detects the leading edge of the document (step S402). When the amount of drive of the feeding motor 45 reaches the predetermined value before the second document detector 32 detects the leading edge of the document (Yes in step S402), the controller 40 determines that a jam has occurred and stops the transport of the document P (step S404), and sounds an alert indicating an occurrence of a transport error (step S405). The predetermined value of the amount of drive of the feeding motor 45 in step S402 is an amount of drive of the feeding motor 45 in feeding a document P from the first document detector 31 to the second document detector 32 with a certain amount of margin added to the amount of drive.

When the second document detector 32 has detected the leading edge of the document before the amount of drive of the feeding motor 45 reaches the predetermined amount (Yes in step S402), the controller 40 determines whether an amount of drive of the transport motor 46 reaches the predetermined value before the reading section 20 detects the leading edge of the document (step S403). When the amount of drive of the transport motor 46 reaches the predetermined value before the reading section 20 detects the leading edge of the document (Yes in step S403), the controller 40 determines that a jam has occurred and stops the transport of the document P (step S404), and sounds an alert indicating an occurrence of a transport error (step S405). The predetermined value of the amount of drive of the transport motor 46 in step S403 is an amount of drive of the transport motor 46 in feeding a document P from the second document detector 32 to the reading section 20 with a certain amount of margin added to the amount of drive.

Next, the abnormality determination relating to the transport of a document P by using the two-dimensional sensor 36 is described. The scanner 1A according to the embodiment performs the abnormality determination relating to transport of a document P based on a value detected by the two-dimensional sensor 36, and when a predetermined condition is satisfied, determines that an error has occurred and stops the transport of the document P. In this embodiment, specifically, the feeding motor 45 (FIG. 4) and the transport motor 46 (FIG. 4) are stopped. The two-dimensional sensor 36 has the image sensor 36d having pixels arranged along the first axis direction Ax and the second axis direction Ay, which is orthogonal to the first axis direction Ax, as described above, and disposed such that the first axis direction Ax is directed the X direction, and the second axis direction Ay is directed the Y direction as illustrated in FIG. 3.

Figure 5:
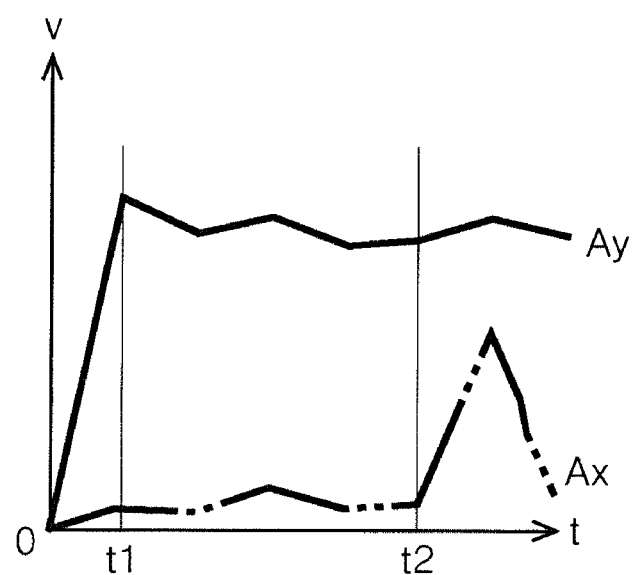
FIG. 5 is a graph illustrating example velocities in a first axis and a second axis detected by a two-dimensional sensor.

The graph in FIG. 5 illustrates a relationship between velocity and time based on detection values in the first axis direction Ax and the second axis direction Ay. Note that the graph in FIG. 5 is made on the assumption that the attachment angle of the two-dimensional sensor 36 would include a certain deviation due to an attachment error. The graph in FIG. 5 illustrates the velocity changes in the first axis direction Ax and the second axis direction Ay after the feeding of a document P was started from a stopped state and a skew occurred during the feeding, wherein the time t=0 to t1 is an acceleration period, and a period after the acceleration period is a constant speed period, and in the constant period, a skew started at time t2. In the example skewing of the document P, the document P skewed in the +X direction at the position of the two-dimensional sensor 36.

The X-direction components of the document P in the moving direction due to the skew of the document P are directly reflected in the velocity change in the first axis direction Ax. The velocity in the second axis direction Ay changed little even though the X-direction movement components were produced due to the skewed document P, or even though the velocity changed, the degree of change was very little as compared with the velocity change in the first axis direction Ax. As described above, the controller 40 can determine a transport error based on detection values obtained by the two-dimensional sensor 36, in particular, in this embodiment, based on detection values in the first axis direction Ax obtained by the two-dimensional sensor 36, and when the controller 40 determines a transport error, stops the transport of the document P. More specifically, the feeding motor 45 (FIG. 4) and the transport motor 46 (FIG. 4) are stopped.

In the transport of a document P, however, temporary transport variations may occur although the transport variations are not due to a transport error such as a jam, and such transport variations may be erroneously detected as a transport error such as a jam. To solve the problem, a period that includes a time such transport variations may occur is defined, and during the period, the controller 40 according to the embodiment continues the transport of the document P irrespective of detection values in the first axis direction Ax obtained by the two-dimensional sensor 36. In the following description, the period including a time such transport variations may occur, that is, the period in which the transport of the document P is continued irrespective of detection values in the first axis direction Ax obtained by the two-dimensional sensor 36, is defined as a "mask period". The expression "the transport of the document P is continued irrespective of detection values in the first axis direction Ax obtained by the two-dimensional sensor 36" means that during the mask period, detection values in the first axis direction Ax obtained by the two-dimensional sensor 36 are not used or the detection values are used for certain processing but the transport of the document P is not stopped based on the detection values, or, during the mask period, the detection values in the first axis direction Ax may not be obtained by the two-dimensional sensor 36.

During the mask period, the transport of the document P may be stopped due to factors other than detection values obtained by the two-dimensional sensor 36.

Figure 6:
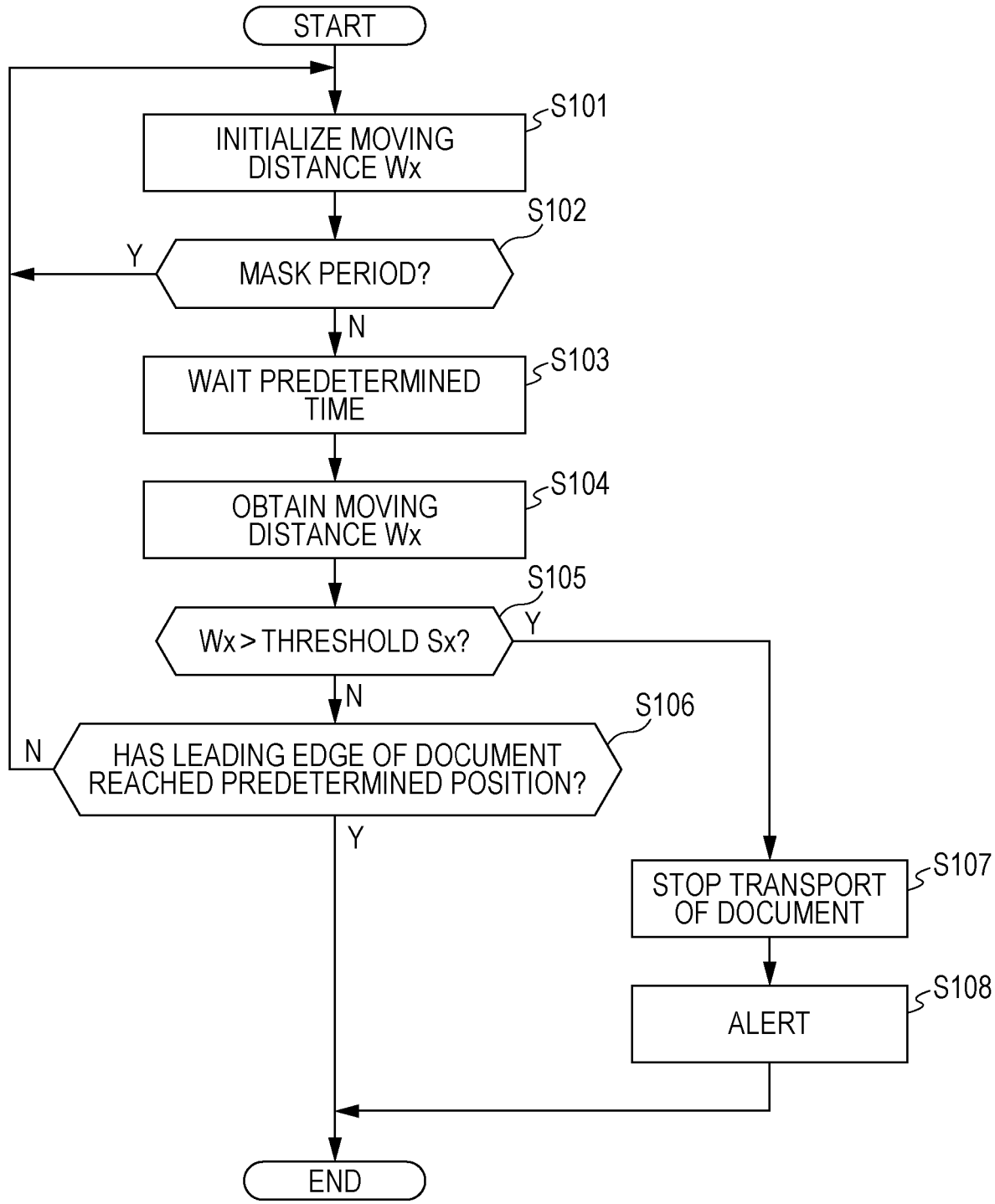
FIG. 6 is a flowchart illustrating a flow of abnormality determining processing in document scanning.

As illustrated in FIG. 6, when an instruction of executing document scanning is issued by a user, the controller 40 initializes the moving distance in the first axis direction Ax of the two-dimensional sensor 36 (step S101). Then, whether the current time is in the mask period is determined (step S102). When the current time is in the mask period (Yes in step S102), the processing in step S101 is repeated until the mask period passes without other particular processing performed. When the current time is not in the mask period or the mask period has passed (No in step S102), the controller 40 waits a predetermined time (for example, 10 ms) (step S103), and obtains a moving distance Wx (step S104). Every time the controller 40 waits the predetermined time (step S103), that is, every time the controller 40 obtains a moving distance Wx, the moving distance Wx is initialized, and thus the moving distance Wx obtained in step S104 corresponds to a moving velocity per wait time of the predetermined time period.

Each obtained moving distance Wx, that is, the document moving velocity per predetermined wait time is compared with a threshold value (step S105). Specifically, whether a moving distance Wx exceeds a threshold Sx is determined. When a moving distance Wx exceeds the threshold Sx, it can be determined that the document P has skewed. Accordingly, when the condition is satisfied (Yes in step S105), the controller 40 determines that a transport error has occurred and stops the transport of the document P (step S107), and sounds an alert indicating the occurrence of the transport error (step S108). In step S105, if the condition is not satisfied, the above-described processing is repeated until the leading edge of the document reaches a predetermined position (for example, the downstream side of the discharging roller pair 17) (step S106).

Hereinafter, the mask period will be described. In the following description, the mask period includes first to fourth mask periods; however, as a mask period to be actually used, one of the first to fourth mask periods may be used or a combination of a plurality of periods may be used. First, the first mask period will be described. The first mask period is a time at which a trailing edge of a document P being nipped by the feeding roller 14 and the separation roller 15, which serve as the feeding section, is released from the nipped state.

Figure 7:
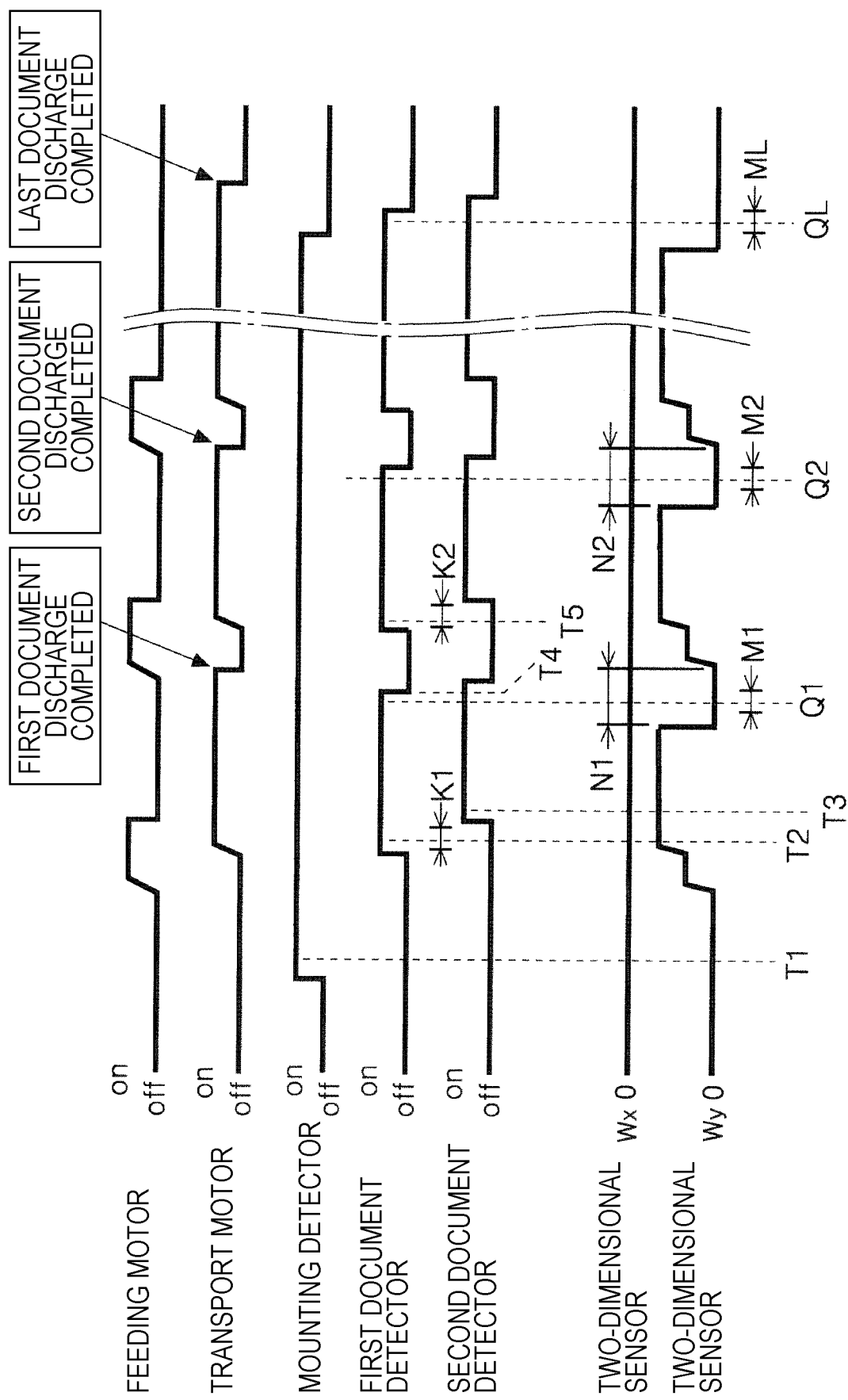
FIG. 7 is an example timing chart of motors, sensors, and other components in document scanning.
Figure 8:
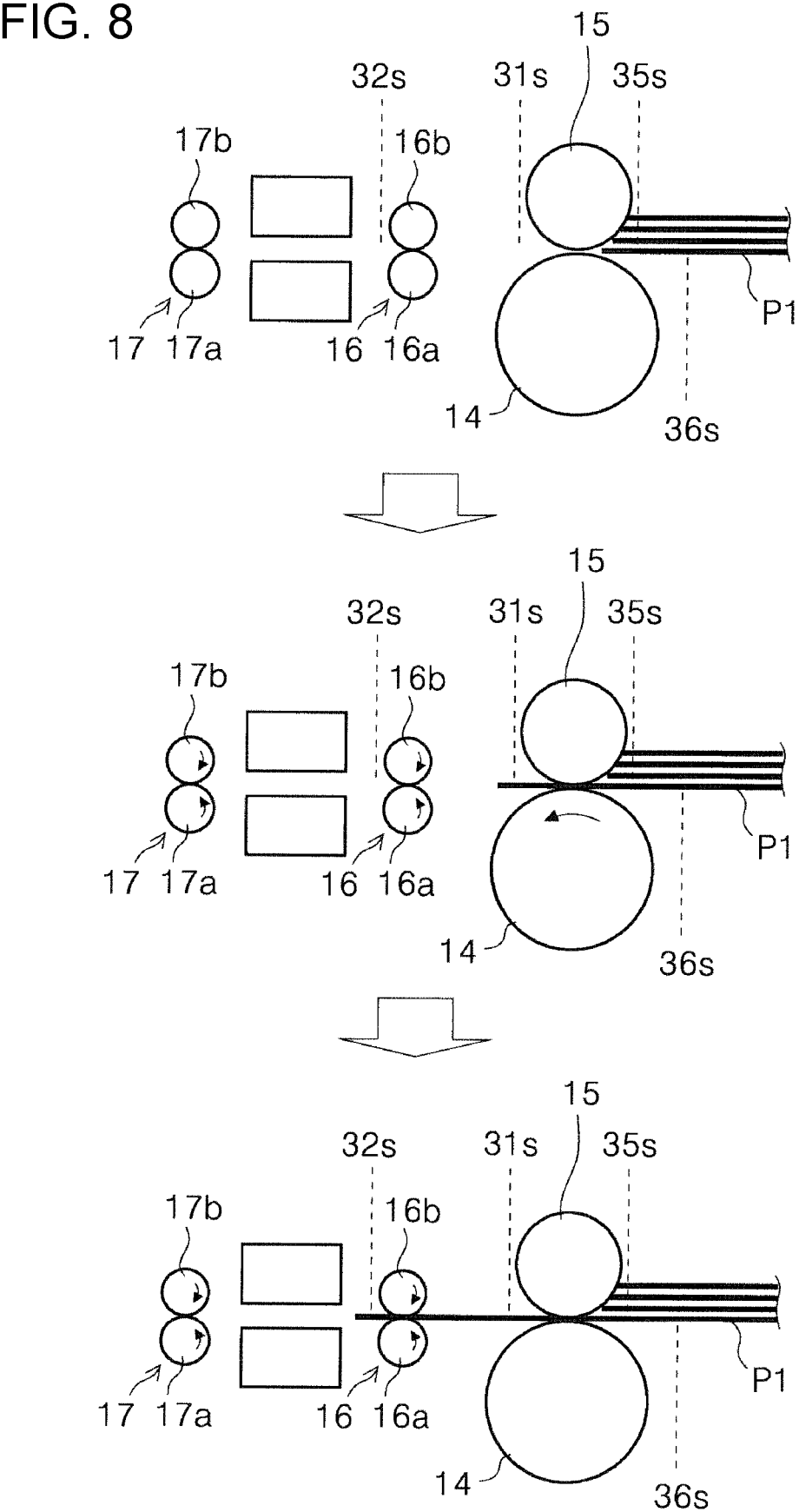
FIG. 8 is a side view illustrating positions of documents on a document transport path in document scanning.

Hereinafter, operations of the motors and detection states of the sensor in document scanning will be described with reference to FIG. 7. A timing T1 indicates a timing after a document P is mounted on the document mounting section 11 and before a feeding operation is started. This state corresponds to the uppermost drawing in FIG. 8. Note that a position 36s in FIG. 8 and FIG. 9 indicates a document detection position by the two-dimensional sensor 36. Similarly, a position 35s indicates a document detection position by the document mounting section 11, a position 31s indicates a document detection position by the first document detector 31, and a position 32s indicates a document detection position by the second document detector 32.

In response to a start of a scanning operation from a state a document P is mounted on the document mounting section 11, the feeding motor 45 starts rotating and thereby a detection value Wy in the second axis direction Ay obtained by the two-dimensional sensor 36 changes. When the leading edge of the document reaches the first document detector 31, the controller 40 starts the rotation of the transport motor 46. FIG. 7 is a timing chart illustrating the above-described operations. The second drawing from the top in FIG. 8 corresponds to the time T2 in FIG. 7.

The leading edge of the document reaches the second document detector 32. Then, the controller 40 turns off the feeding motor 45. The lowermost drawing in FIG. 8 corresponds to the time T3 in FIG. 7. When the second document detector 32 detects the leading edge of the document, the controller 40 starts a reading operation. After that, the trailing edge of the document P passes through the position of the two-dimensional sensor 36, and thus the detection value Wy becomes zero. The document P subsequently passes through the nip position between the feeding roller 14 and the separation roller 15 (time Q1 in FIG. 7). The uppermost drawing in FIG. 9 corresponds to the time Q1 in FIG. 7.

A first mask period M1 includes the time Q1, and the first mask period M1 starts, for example, after the detection value Wy in the second axis direction Ay obtained by the two-dimensional sensor 36 has changed from the predetermined value to zero, that is, after the trailing edge of the document has passed through the two-dimensional sensor 36, at a time the document P is transported by a predetermined amount or a time after a predetermined time has passed. Alternatively, the first mask period M1 may be set as described below. When the trailing edge of the document passes through the nip position between the feeding roller 14 and the separation roller 15, the next document P slightly moves downstream and then the separation roller 15 reversely rotates to return the moved document P upstream, and thus the detection value Wy in the second axis direction Ay obtained by the two-dimensional sensor 36 changes from a substantially zero to a negative value. Accordingly, the first mask period M1 may be set to the time.

Then, the trailing edge of the document passes through the first document detector 31 (time T4). The second drawing from the top in FIG. 9 corresponds to the time T4 in FIG. 7. After the trailing edge of the document passes through the first document detector 31, the controller 40 starts driving the feeding motor 45 to feed the next document P. After the trailing edge of the document P being read passes through the second document detector 32 and the document P is transported by a predetermined amount, or a predetermined time has passed, the controller 40 determines that the discharging of the document P has completed, and stops the transport motor 46. The predetermined amount of transport can be obtained from a distance between the second document detector 32 and the discharging roller pair 17, and the predetermined time can be obtained from the relationship between the distance between the second document detector 32 and the discharging roller pair 17 and the speed of feeding the document P. After the completion of the discharge of the first document P, similarly, the reading operations of the second and third documents are sequentially performed. At the time Q2 in FIG. 7, the trailing edge of the second document P passes through the nip position between the feeding roller 14 and the separation roller 15, and the first mask period M2 is set to the time Q2.

Figure 9:
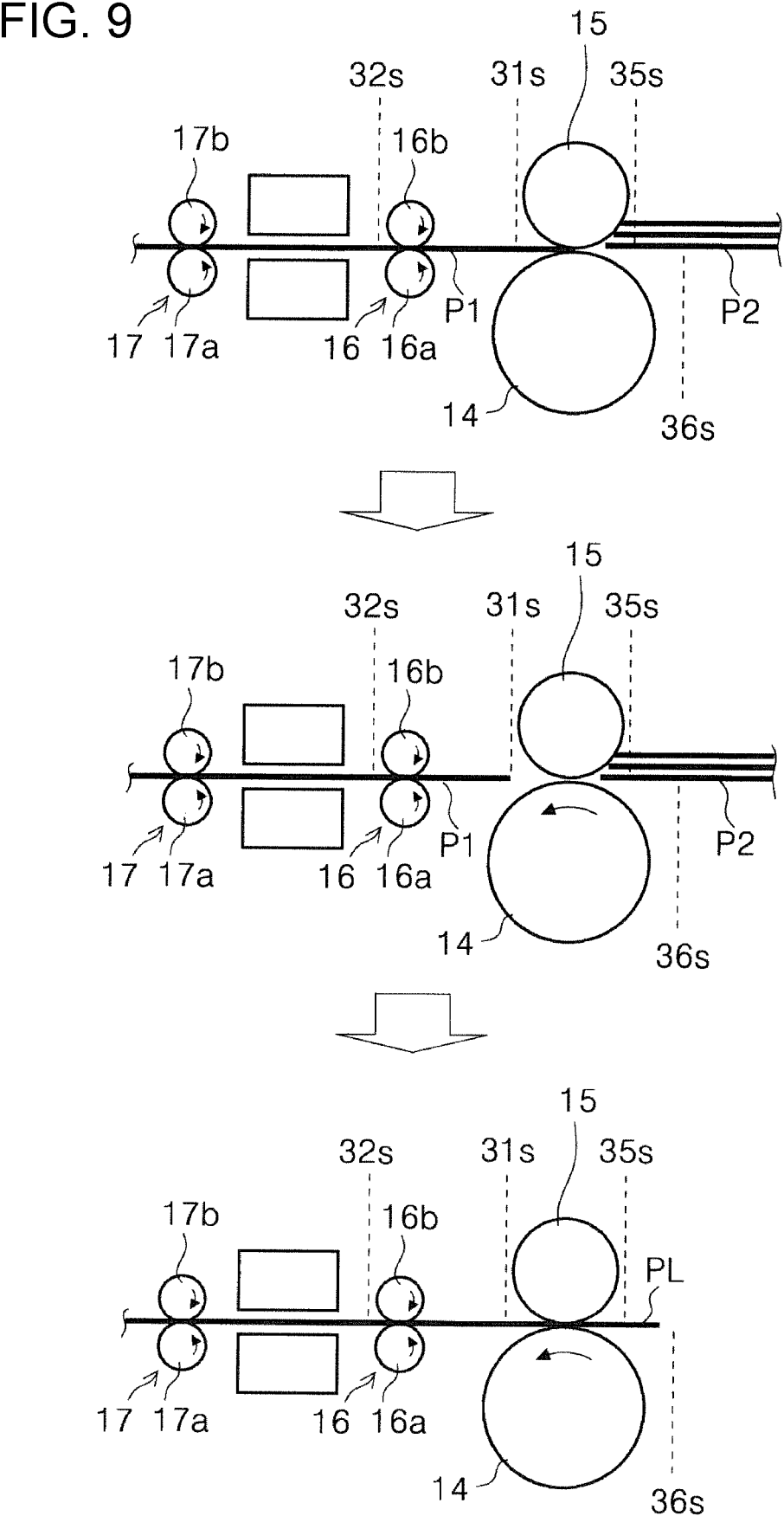
FIG. 9 is a side view illustrating positions of documents on a document transport path in document scanning.

Note that when the detection signal obtained by the mounting detector 35 is off, that is, when the last document P (hereinafter, referred to as "last document PL") on the document mounting section 11 is fed as illustrated in the lowermost drawing in FIG. 9, a period ML including a time (time QL in FIG. 7) at which the trailing edge of the last document PL passes through the nip position between the feeding roller 14 and the separation roller 15 may be included or may not be included in the first mask period.

As described above, in this embodiment, during the first mask period including the time temporary transport variations tend to occur, that is, the time at which the trailing edge of a document passes through the nip position between the feeding roller 14 and the separation roller 15, the transport of a document P is continued irrespective of detection values Wx in the first axis direction Ax and detection values Wy in the second axis direction Ay obtained by the two-dimensional sensor 36. With this operation, an erroneous determination based on the temporary transport variations can be prevented or reduced. In the above-described embodiment, the first mask period includes the time at which the trailing edge of a document passes through the nip position between the feeding roller 14 and the separation roller 15; however, the first mask period may be a period including a time at which the trailing edge of the document passes through the transport roller pair 16, or a period including a time at which the trailing edge of the document passes through the discharging roller pair 17. The time at which the trailing edge of the document passes through the transport roller pair 16 can be determined based on a time at which the trailing edge of the document is detected by the first document detector 31. The time at which the trailing edge of the document passes through the discharging roller pair 17 can be determined based on a time at which the trailing edge of the document is detected by the first document detector 31, or a time at which the trailing edge of the document is detected by the second document detector 32, and by adding a document feeding amount. When a plurality of first mask periods can be used as described above, the first mask periods may be appropriately combined and used.

When the length in the transport direction of a document P is such that the trailing edge of the document P is on the upstream side of the nip position between the feeding roller 14 and the separation roller 15 when the leading edge reaches the area to be read by the reading section 20, a skew state can be checked by reading the leading edge of the document by the reading section 20. Accordingly, the first mask period may be provided only when the skewing of a document P being transported exceeds a predetermined level.

As the mask period, a second mask period described below may be used. The second mask period is a period including a time at which the trailing edge of a document is nipped by the roller pairs. Specifically, the second mask period may be a period including the time at which a leading edge of a document is nipped by the feeding roller 14 and the separation roller 15, may be a period including a time at which a leading edge of a document is nipped by the transport roller pair 16, or may be a period including a time at which a leading edge of a document is nipped by the discharging roller pair 17. The periods K1 and K2 in FIG. 7 are example periods during which a leading edge of a document is nipped by the transport roller pair 16. The time at which the leading edge of the document is nipped by the feeding roller 14 and the separation roller 15 can be determined based on a time at which the driving of the feeding motor 45 is started. The time at which the leading edge of the document is nipped by the transport roller pair 16 can be determined based on a time at which the leading edge of the document is detected by the first document detector 31. The time at which the leading edge of the document is nipped by the discharging roller pair 17 can be determined based on a time at which the leading edge of the document is detected by the first document detector 31, or a time at which the leading edge of the document is detected by the second document detector 32, and by adding a document feeding amount. When a plurality of second mask periods can be used as described above, the second mask periods may be appropriately combined and used.

As the mask period, a third mask period described below may be used. The third mask period is a period after a trailing edge of a document passes through the detection position of the two-dimensional sensor 36 and before the start of the feeding of the next document P, for example, as illustrated in FIG. 7 by reference numerals N1 and N2. After a trailing edge of a document being transported passes through the detection position of the two-dimensional sensor 36, before the start of the feeding of the next document P, the two-dimensional sensor 36 faces the next document P to be fed. The next document P to be fed is in contact with the document P being fed and the position may be changed, and this may be erroneously determined that the document P being transported is under an abnormal condition.

Accordingly, during the third mask period, the transport of the document P is continued irrespective of a detection value Wx in the first axis direction Ax and a detection value Wy in the second axis direction Ay obtained by the two-dimensional sensor 36. With this operation, the above-described erroneous determination can be prevented or reduced.

Whether a trailing edge of a document has passed through the detection position of the two-dimensional sensor 36 can be determined based on a detection value Wy in the second axis direction Ay obtained by the two-dimensional sensor 36, and when a detection value Wy becomes zero from a predetermined value, the document P may be stopped due to a transport error. The case in which the trailing edge of the document has passed through the detection position of the two-dimensional sensor 36 and the case in which the transport error has occurred can be distinguished based on the information concerning the transport length of the document P. The transport length of a document P can be obtained, for example, by document size information input by a user via the operation panel 7 (FIG. 1, FIG. 4), or the length of the preceding scanned document P may be detected and used. When there is no preceding page, the third mask period may be omitted.

Figure 10:
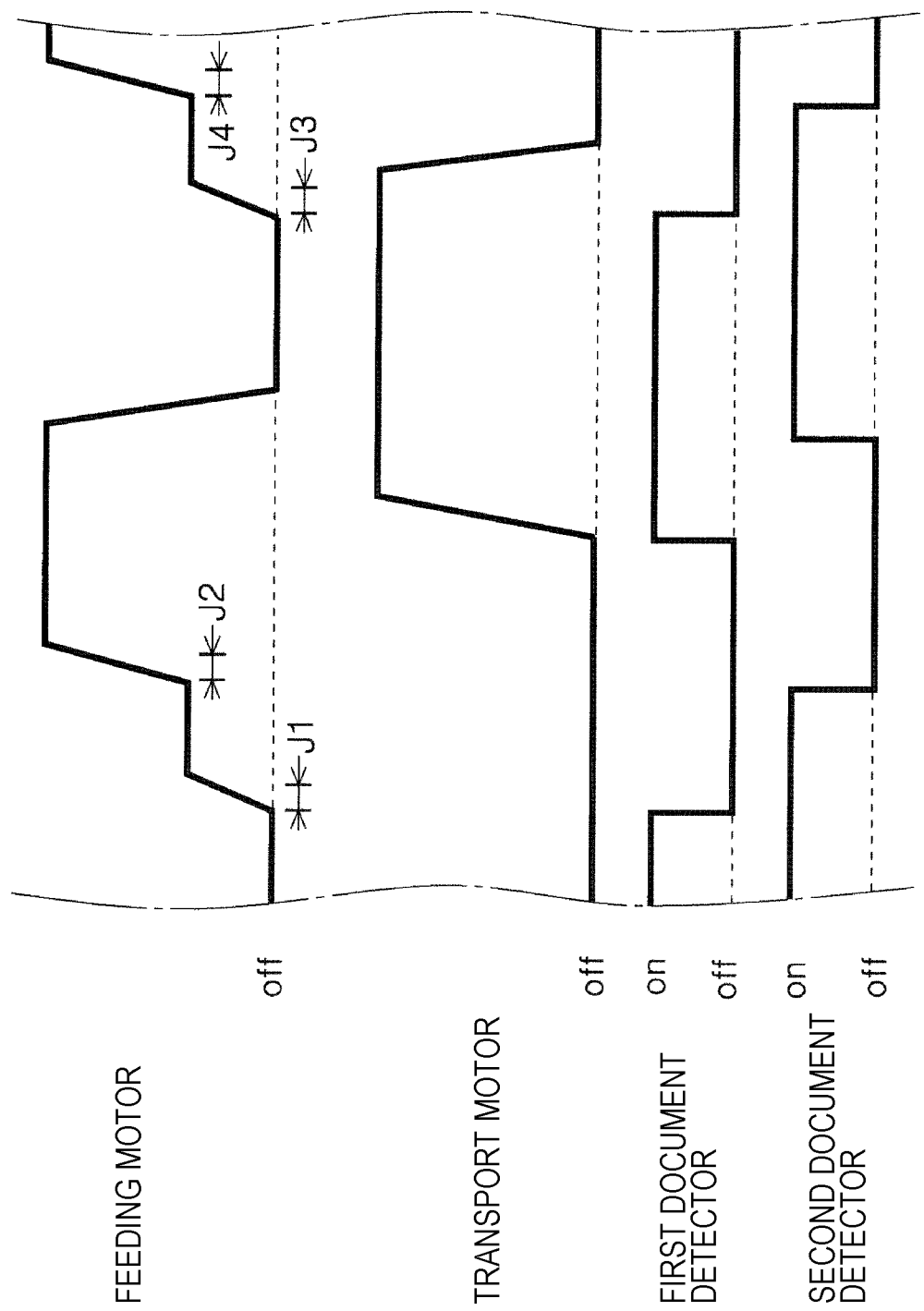
FIG. 10 is an example timing chart of motors, sensors, and other components in document scanning.

As the mask period, a fourth mask period described below may be used. The fourth mask period includes a time at which the feeding speed of a document P changes, for example, as illustrated in FIG. 10 by reference numerals J1, J2, J3, and J4. Note that in the timing chart of the feeding motor 45 in FIG. 10, the vertical axis indicates the rotation speed. Before a leading edge of a document P reaches the transport roller pair 16, the document feeding speed changes with the change in the rotation speed of the feeding motor 45.

The fourth mask periods J1 and J3 are predetermined periods after the start of the drive of the feeding motor 45, and the fourth periods J2 and J4 are predetermined periods after the feeding motor 45 in a constant-speed driven state has changed to an accelerated state. Specifically, when the document feeding speed changes, a temporary transport variation tends to occur, and temporary variations in a detection value Wx in the first axis direction Ax and a detection value Wy in the second axis direction Ay obtained by the two-dimensional sensor 36 tend to occur, thus an erroneous transport abnormality determination can be made. To solve the problem, during the fourth mask period, the transport of the document P is continued irrespective of a detection value Wx in the first axis direction Ax and a detection value Wy in the second axis direction Ay obtained by the two-dimensional sensor 36, and thus the above-described erroneous determination can be prevented or reduced.

In particular, when the document feeding speed is changed to an acceleration state, temporary transport variations tend to occur. Accordingly, during the periods including times at which the document feeding speed is changed to an acceleration state as in the fourth mask periods J1, J2, J3, and J4 in FIG. 10, the transport of the document P is continued irrespective of a detection value Wx in the first axis direction Ax and a detection value Wy in the second axis direction Ay obtained by the two-dimensional sensor 36, and thus such an erroneous determination due to the temporary transport variations can be more efficiently prevented or reduced. Note that the fourth mask period may include a time at which the document feeding speed is changed from a constant speed state to a deceleration state.

In the above-described embodiment, in each of the first to fourth mask periods, the transport of a document P is continued irrespective of a detection value Wx in the first axis direction Ax and a detection value Wy in the second axis direction Ay obtained by the two-dimensional sensor 36. Alternatively, in determining to stop the transport of the document P, a first threshold value and a second threshold value that is used in determining to stop the transport of the document P at a lower level than a level the first threshold value is used may be used. In the mask periods, the second threshold value may be used and in other periods, the first threshold value may be used. With the values, an erroneous determination due to a temporary transport variation can be prevented or reduced.

The above-described embodiment may be modified as follows.

1. In the above-described embodiment, the two-dimensional sensor 36 is applied to the scanner, which is an example image reading apparatus. Alternatively, the two-dimensional sensor 36 may be applied to recording apparatuses that have a recording head for performing recording onto a medium, such as printers.

2. In the above-described embodiment, the two-dimensional sensor 36 is disposed in the document mounting section 11; however, depending on settings of the mask periods, the two-dimensional sensor 36 may be disposed at a position on the downstream side of the feeding roller 14.

3. In the above-described embodiment, the transport abnormality determination by the two-dimensional sensor 36 may be switched by a user setting between a mode of performing the determination and a mode of not performing the determination.

4. In the above-described embodiment, the two-dimensional sensor 36 includes the controller 36*a* (FIG. 4), and the controller 36*a* analyzes an image captured by the image sensor 36*d* and outputs a moving distance Wx of the image in the first axis direction Ax and a moving distance Wy of the image in the second axis direction Ay as detection values (output values) to the controller 40. Alternatively, the controller 40 may perform the function of the controller 36*a*.

5. In the above-described embodiment, the two-dimensional sensor 36 is used as the sensor for detecting motion of a document P. Alternatively, when the control is performed by using only a detection value in the first axis direction Ax, a one-dimensional sensor for obtaining only a detection value in the first axis direction Ax may be used, or when the control is performed by using only a detection value in the second axis direction Ay, a one-dimensional sensor for obtaining only a detection value in the second axis direction Ay may be used.

6. In the above-described embodiment, the feeding roller 14 and the two-dimensional sensor 36 face a lowermost document P of documents P mounted on the document mounting section 11; however, the feeding roller 14 and the two-dimensional sensor 36 may face an uppermost document P of documents P mounted on the document mounting section 11.

What is claimed is:

1. A medium transport apparatus comprising:
    a feeding section configured to nip a medium and feed the medium in a transport direction;
    a sensor disposed to face a side of the medium being transported in the transport direction, the sensor being configured to detect motion of the medium in a first direction and a second direction; and
    a control unit configured to stop the transport of the medium based on a detection value received from the sensor, wherein
    during a mask period including a time at which a leading edge of the medium is nipped by the feeding section, the detection value of the sensor is masked such that the control unit continues transporting the medium irrespective of the detection value from the sensor.

2. The medium transport apparatus according to claim 1, wherein the sensor is a two-dimensional sensor configured to detect motion of the medium in a two-dimensional coordinate system having a first axis and a second axis.

3. Image reading apparatus comprising:
a reading section configured to read a medium; and
the medium transport apparatus according to claim 1 configured to transport the medium to the reading section.

4. A medium transport apparatus comprising:
a feeding section configured to nip a medium and feed the medium in a transport direction;
a sensor disposed to face a side of the medium being transported in the transport direction, the sensor being configured to detect motion of the medium in a first direction and a second direction; and
a control unit configured to stop the transport of the medium based on a detection value received from the sensor, wherein
during a mask period including a time at which a trailing edge of the medium is released from the state nipped by the feeding section, the detection value of the sensor is masked such that the control unit continues transporting the medium irrespective of the detection value from the sensor.

5. The medium transport apparatus according to claim 4, further comprising:
a medium mounting section on which a medium is to be mounted, wherein
the feeding section comprises a feeding roller configured to feed the medium from the medium mounting section; and
a separation roller configured to nip the medium with the feeding roller therebetween to separate the medium.

6. A medium transport apparatus comprising:
a feeding section configured to nip a medium and feed the medium in a transport direction;
a sensor disposed to face a side of the medium being transported in the transport direction, the sensor being configured to detect motion of the medium in a first direction and a second direction; and
a control unit configured to stop the transport of the medium based on a detection value received from the sensor, wherein
during a mask period including a time at which a speed of feeding the medium is changed, the detection value of the sensor is masked such that the control unit continues transporting the medium irrespective of the detection value from the sensor.

7. The medium transport apparatus according to claim 6, wherein during a period including a time at which the document feeding speed is changed from zero or a constant speed state to an accelerated state, the control unit continues transporting the medium irrespective of the detection value from the sensor.

8. A medium transport apparatus comprising:
a medium mounting section on which a medium is to be mounted;
a feeding roller configured to feed the medium from the medium mounting section;
a sensor disposed to face a side of the medium being transported in the transport direction, the sensor being configured to detect motion of the medium in a first direction and a second direction; and
a control unit configured to stop the transport of the medium based on a detection value received from the sensor, wherein
during a mask period including a time at which a trailing edge of the medium being transported passes through a detection position of the sensor before the start of the feeding of a next medium, the detection value of the sensor is masked such that the control unit continues transporting the medium irrespective of the detection value from the sensor.

9. A medium transport apparatus comprising:
a feeding section configured to nip a medium and feed the medium in a transport direction;
a sensor disposed to face a side of the medium being transported in the transport direction, the sensor being configured to detect motion of the medium in a first direction and a second direction; and
a control unit configured to stop the transport of the medium based on a detection value received from the sensor, wherein
in determining to stop the transport of the medium, the control unit uses a first threshold value and a second threshold value that is used in determining to stop the transport of the medium at a lower level than a level the first threshold value is used, and during a period including at least one of a time at which a leading edge of the medium is nipped by the feeding section and a time at which a trailing edge of the medium is released from the state nipped by the feeding section, the control unit uses the second threshold value and during the other periods, uses the first threshold value.

10. A transport control method in a medium transport apparatus including a feeding section configured to feed a medium in a transport direction; and
a sensor disposed to face a side of the medium being transported in the transport direction, the sensor being configured to detect motion of the medium in a first direction and a second direction, the method comprising:
during a period including one of a time at which a leading edge of the medium is nipped by the feeding section and a time at which a trailing edge of the medium is released from the state nipped by the feeding section, masking a detection value output by the sensor and transporting the medium irrespective of the detection value from the sensor.

* * * * *